Feb. 1, 1966   S. LEES ETAL   3,233,173
METHOD OF DETERMINING THE VOLUME OF PARTICLES IN A MIXTURE
Filed April 28, 1958   2 Sheets-Sheet 1

INVENTOR.
Sidney Lees
Dwight W. Batteau
BY R. Stephen Kleinschmidt attorney

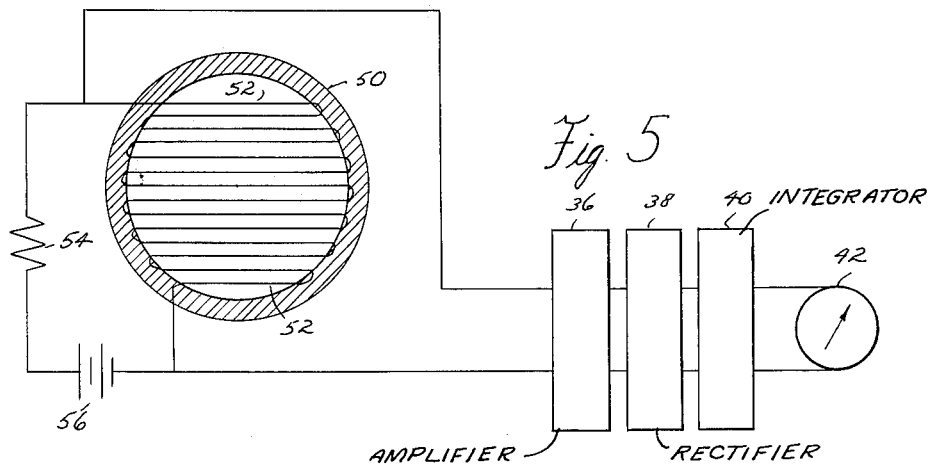
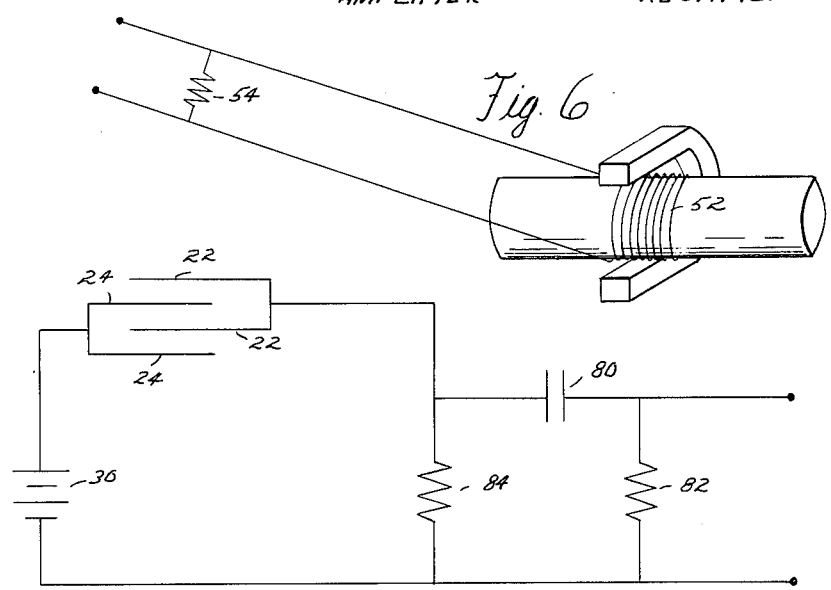
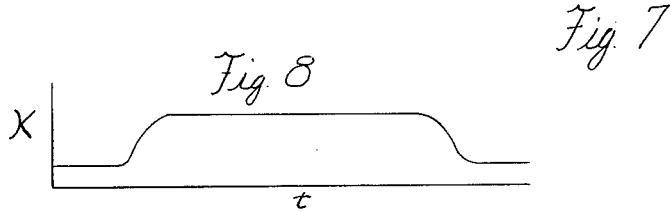
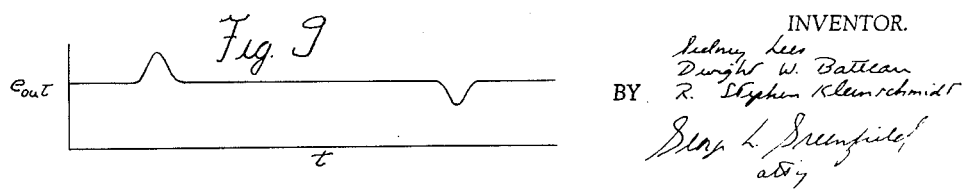
INVENTOR.
Sidney Lees
Dwight W. Batteau
R. Stephen Kleinschmidt
BY
George L. Greenfield
atty

United States Patent Office 3,233,173
Patented Feb. 1, 1966

3,233,173
METHOD OF DETERMINING THE VOLUME OF PARTICLES IN A MIXTURE
Sidney Lees, Newton, Dwight W. Batteau, Cambridge, and R. Steven Kleinschmidt, Sudbury, Mass.; said Batteau assignor to United Research Inc., Cambridge, Mass., a corporation of Massachusetts
Filed Apr. 28, 1958, Ser. No. 731,222
1 Claim. (Cl. 324—61)

This invention relates to indicating devices and more particularly comprises a new and improved method of detecting moving particles in a medium.

Although our invention has general application, it is particularly suited for detecting contaminants in a fuel system. With the new types of aircraft, the problem of fuel contamination has become particularly severe. It is now necessary to reduce contaminants due to occluded water and solids to less than a few parts per million.

One important object of our invention is to provide a detection system which may control an alarm or signaling device to indicate excessive amounts of contaminants in a fuel line.

Another important object of our invention is to provide a method for detecting changes in the electromagnetic properties of a material passing through a duct. As used in this application, the expression "electromagnetic properties" pertains to those manifestations of matter and space related to electrical forces, magnetic forces and the interrelations that pertain to them.

Still another important object of our invention is to provide a method of measuring the volume of particles moving through or with any medium.

Yet another important object of our invention is to provide a method of measuring the ratio of the volume of particles to the total volume of the medium carrying the particles.

Still another important object of our invention is to provide a method of detecting and measuring individual particles moving through or with any medium.

Our invention includes several embodiments for carrying out the stated objects. One embodiment of our invention is capable of detecting variations in the net dielectric constant of a material flowing through a duct. Another embodiment of our invention is capable of detecting variations in the net magnetic permeability of the material in the duct. In a third embodiment, the variations in resistance of the material is detected and utilized to obtain the desired information.

In the first embodiment of our invention a number of parallel plates are arranged in planes parallel to the direction of flow in a line carrying the medium. The plates form a bank of capacitors through which all of the fluid medium must flow to reach its ultimate destination. The total capacitance of the capacitors is directly proportional to the net dielectric constant of the material between the plates (in this case the fluid plus the contaminants). The bank of capacitors is connected in series with a D.C. power supply and a resistor. As will be more fully explained in the detailed specification, the time characteristics of the resistance capacitance network determine the nature of the information which may be obtained from it regarding the quantity of particles in the system. The signals obtained from the capacitors are supplied to a measuring circuit to determine the volume of the particles or other information about the nature of the particles.

Although we have suggested the use of a D.C. power supply and a plurality of parallel plates, it should be understood that an A.C. power source may be used and that other geometric arrangements may be used to form the capacitors to suit the application.

In other embodiments of our invention, the capacitors are replaced by coils of wire and the medium bearing the particles is passed through or about the coils. The inductance of the coils is a function of the net permeability relating to the coils (determined by the net magnetic permeability of the medium plus the particles). By means of an electrical network and a measuring circuit similar to that used with the capacitors, the volume of the particles or other information pertaining to the particles may be derived.

These and other objects and features of our invention along with incident advantages will be better understood and appreciated from the following detailed description of a number of embodiments thereof selected for purposes of illustration and shown in the accompanying drawings in which:

FIGURE 5 is a view similar to FIG. 2 and showing another embodiment of our invention including its measuring circuit;

FIGURE 6 is a perspective view of still another embodiment of our invention;

FIGURE 7 is a schematic diagram of yet another embodiment of our invention; and

FIGURES 8 and 9 are graphs illustrating the variations in charge and output voltage in the electrical network resulting from a particle passing through a portion of the network.

Figure 1:
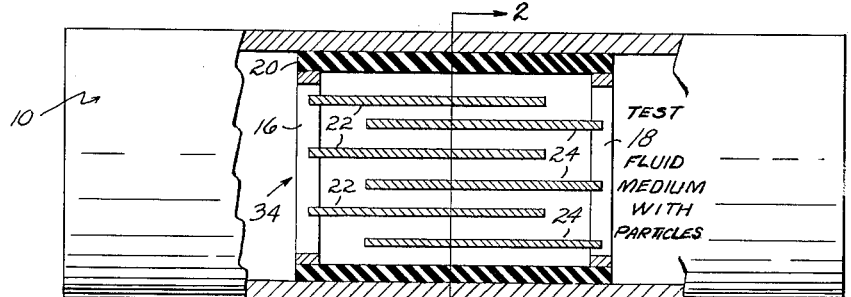
FIGURE 1 is a side view partly in section of a conduit in which is mounted a particle detection system constructed in accordance with our invention.

For purposes of clarity, the following specification will describe the invention in terms of the measurement of contaminants in a fuel line. It is to be understood, however, that the scope of our invention exceeds this specific application. Thus, in FIG. 1 our invention is assembled in a fuel line 10.

Disposed within the fuel line 10 are a pair of parallel rings 16 and 18 made of an electrically conductive material and insulated from one another and from the line 10 by a non conducting sleeve 20. A number of parallel plates 22 are carried by and electrically connected to the ring 16 and extend in the direction of the other ring 18. A second set of plates 24 are mounted and electrically connected to the ring 18 and extend between the plates 22 towards the ring 16. The plates 22 and 24 are arranged across the entire diameter of the line 10 within the sleeve 20 and are so disposed that all of the fluid passing through the fuel line passes between the plates 22 and 24. The sleeve 20 may be connected to the marginal edges of the plates 22 and 24 to lend strength to the assembly.

The plates 22 and 24 arranged in the manner described form a number of capacitors connected electrically in parallel relationship. The capacitance of each of the capacitors and thus the total capacitance of the system varies directly with the type of dielectric material disposed between the plates. When the dielectric constant of the contaminants is different from the dielectric constant of the fuel in the line 10, a particle of the contaminants will cause a fluctuation in the signal voltage in the electrical network coupled to the capacitors when the particle crosses the boundary of the electrical field between two plates of the capacitors. A similar signal appears when the particle emerges from the electrical field. The signal voltage variation, as described below, depends upon the rate of change with respect to time of the dielectric properties of the medium between the capacitor plates. The manner for using the signal variations to measure the total particle volume contained in the fuel is explained below.

Figure 3:
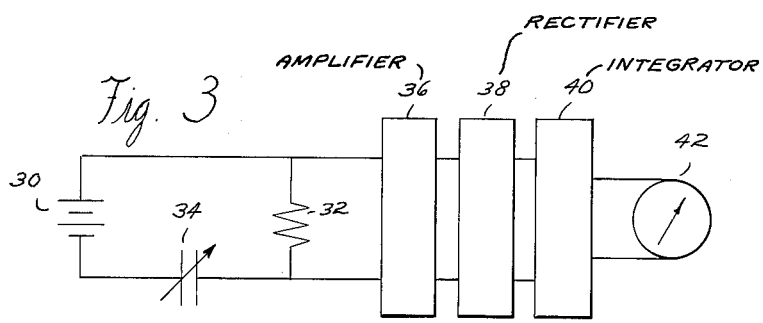
FIGURES 3 and 4 are schematic diagrams of electrical networks and measuring circuits which may incorporate the structure shown in FIGS. 1 and 2.

If the time constant of the network is shorter than the time required for the individual particles to move through the electrical field boundary, the circuit shown in FIG. 3 may be used to determine the particle volume. In that figure the electrical circuit includes the capacitors formed by the plates 22 and 24. As suggested earlier, by connecting the rings 16 and 18 across a voltage source, the capacitors formed by the plates 22 and 24, are arranged in parallel and their capacitance is additive in determining the total capacitance of the system. The capacitor 34, shown in FIG. 3, represents the total of the capacitors formed by the plates 22 and 24. The capacitor 34 forms part of an RC network which also includes a D.C. voltage source 30 and a resistor 32. For this simple resistor-capacitor circuit, it is possible to associate an elementary equation describing its performance, namely, $$(1) \qquad Ri = \frac{1}{C}\int_0^t i\,dt = E_{ex}$$

where R is the value of resistor 32;
C is the capacitance of the capacitor 34;
$E_{ex}$ is the D.C. voltage applied to the network; and
$i$ is the current flowing through the network constituted by the resistor and the capacitor.

(2) Setting $e_{out} = Ri$, the equation becomes $$(3) \qquad \int_0^t e_{out}\,dt = RC[E_{ex} - e_{out}]$$

When the time constant of the network is small compared to the duration of the fluctuation and $e_{out}$ is very small compared to $E_{ex}$, then the expression is essentially equal to $$(4) \qquad \int_0^t e_{out}\,dt = RCE_{ex}$$

and the actual voltage across the resistor is $$(5) \qquad e_{out} = RE_{ex}\frac{dC}{dt}$$

since R and $E_{ex}$ are constant.

This equation shows that the output voltage depends upon the time rate of change of the capacitor as previously mentioned. When a particle passes through the capacitor plates, a change in the dielectric constant occurs like that shown in FIG. 8. A change in the charge on the plates occurs corresponding to the variation in the dielectric constant due to the particles. A voltage fluctuation appears simultaneously across the resistor 32 of FIG. 3 in accordance with Equation 5. It is to be observed that there are two pulses of voltage of opposite sense as the particle enters and leaves the capacitor plate. When the network output voltage is amplified and fed to rectifier, the pulses are all made to have the same sense. The integral of a single pulse corresponds to the change in the charge, $\Delta q$, of the capacitor plate as may be seen from Equation 4. From FIG. 8, the change in charge is proportional to the volume of the particle. Hence, by adding the signals representing the individual changes in charge by means of an integrator as shown in FIG. 3, the sum corresponds to the total volume of the particles that pass through the capacitor plate in a given time, as in the following expression:

$$(6) \qquad K\epsilon\Delta q = B$$

where K is a constant that includes geometric factors, network parameters, amplifier, rectifier and integrator sensitivities;
$\epsilon\Delta q$ is the sum of the changes in charge in the capacitor;
B is the total volume of the particles.

In FIG. 3 the measuring circuit is shown to include an amplifier 36, a rectifier 38, an integrator 40 and a meter 42. These are connected in series to the output of the RC network and perform the summation requirements indicated by Equation 6. The value recorded by the meter 42 is directly proportional to the total volume of the contaminants carried through the capacitors. To determine the parts per million of the contaminants to the total fuel flow, it is necessary independently to measure the total volume flowing through the fuel line 10. This measurement may be made with any variety of volumetric flowmeter.

When the time constant of the resistance-capacitance network is long compared to the time of passage of a particle between the plates, the output voltage follows the dielectric constant change shown in FIG. 8. In this situation the charge on the capacitor plates may be regarded as constant, rather than the voltage as in the previous embodiment. It is instructive to write the relationship between capacity and voltage as follows:

$$(7) \qquad CV = q$$

where
$C$ = capacity and is inversely proportional to the dielectric constant;
$V$ = voltage across the plates;
$q$ = charge on the capacitor and is assumed to be invariant for this situation.

In particular, in the reference condition when there are no particles between the plates, Equation 7 takes the form $$(8) \qquad C_0 E_{ex} = q$$

where $C_0$ = reference value of the capacitance.

In general, as is well known, $$(9) \qquad \frac{C_0}{K_0} = \frac{C}{K}$$

where
$K_0$ = dielectric constant of the fluid medium,
$K$ = dielectric constant of fluid medium plus the particles.

When the dielectric constant changes from $K_0$ to $K_0 + \Delta K$, due to a single particle, then from Equation 9

$$(10) \qquad \frac{\Delta C}{C_0} = \frac{\Delta K}{K_0}$$

The corresponding voltage change from $E_{ex}$ to $E_{ex} + \Delta e$ is given by Equation 7, so that $$(11) \qquad \Delta e = -E_{ex}\frac{\Delta C}{C_0} = -\frac{E_{ex}}{K_0}\Delta K$$

This shows that a signal voltage is derived from a change in the dielectric constant.
Furthermore $$(12) \qquad \int_0^t \Delta e\,dt = -\frac{E_{ex}}{K_0}\int_0^t \Delta K\,dt$$

When a particle enters the capacitor plates, altering the dielectric constant by the amount $\Delta K$, and traverses the plates in time T, then $$(13) \qquad \int_0^t \Delta K\,dt = \Delta KT$$

The time of traverse T is given by the expression $$(14) \qquad T = \frac{L}{V}$$

where
$L$ = length of plates,
$V$ = fluid velocity.

Since the change in the dielectric constant, $\Delta K$, introduced by the particle is proportional to its volume, then $$(15) \qquad \Delta B = S\Delta K$$

where
ΔB = volume of the particle,
S = proportionality constant relating volume to dielectric constant change.

It therefore follows that the volume of the particle is proportional to the integral of the voltage change induced in the capacitor plates by the passage of the particles through the plates

(16)
$$\Delta B = S\Delta K = -\frac{S}{T}\frac{K_0}{E_{ex}}\int_0^t \Delta e\, dt = -\frac{SK_0 V}{LE_{ex}}\int_0^t \Delta e\, dt$$

Let the volume of fluid passing through the plate during this time be D, where

(17) $$D = AVt$$

and
A = area of the passage.
Then

(18) $$\frac{\Delta B}{D} = -\frac{SK_0}{LAE_{ex}}\left[\frac{1}{t}\int_0^t \Delta e\, dt\right]$$

In a similar manner it can be shown that when a sequence of particles pass through the capacitor plates, either discreetly or in groups, in such a way that the time each particle dwells between the plates is short compared to the resistance-capacitance characteristic time of the network, the volume of the sum of the particles is given by Equation 16 and the ratio of the particle volume to the total volume is given by Equation 18. The requirement for this embodiment is that the charge on the capacitor plates does not effectively change during the measurement.

Figure 4:
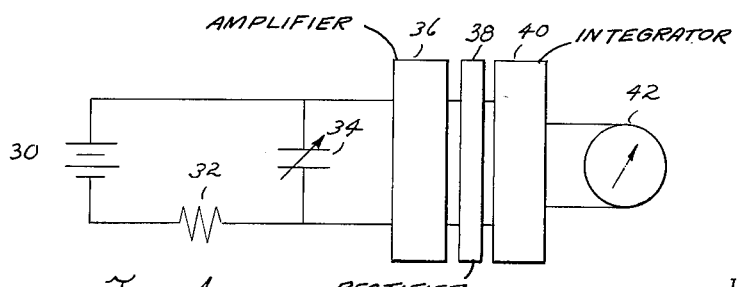

In FIG. 4 we have shown a circuit which may be used when the time constant of the network is long compared to the time required for the particles to pass between the plates. This circuit includes the resistance-capacitance network identical to that shown in FIG. 3 and in addition includes a measuring circuit comprising an amplifier, integrator and meter as suggested at 36, 38 and 42 respectively.

Thus, the ratio of particle volume to total volume may be determined by dividing the time $t$ during which the measurement is made into the output quantity (or signal) of the integrator. The arrangement shown in FIG. 4 is suitable for this purpose.

The reader will note that the signal across the capacitor 34 is directed through an amplifier 36 to an integrator 38. By connecting the meter 42 to the integrator, the output of the integrator may be measured. By dividing the indicated measurement of meter 42 by the time $t$, the concentration of particles in the total flow is derived.

Although the foregoing description has been generally confined to situations wherein a moving medium (fuel) contains a dispersion of contaminants or other foreign matter, it should be understood that a volumetric measurement of particles moving through any medium may be obtained by the method disclosed; that is, the volume of coal moving down a chute may be measured by passing all of the coal between the plates of a capacitor.

In certain applications, it may be desirable to obtain measurements of the variance rather than measurements of the volume or concentration of the particles. By substituting squaring and averaging meters for the integrators in the circuits shown in FIGS. 3 and 4, it will be apparent to those skilled in the art that a measurement of the variance may be obtained. The size distribution of the contaminants may also be determined by substituting pulse-height analyzers for the integrators.

Other applications require a knowledge of the size distribution of the particles and/or concentration. For these applications the height of each pulse can be measured to indicate the size of the particles. When two particles of different size successively penetrate the volume in the capacitors they cause two pulses of correspondingly different height to appear as output signals. It will be apparent to those skilled in the art that the pulse height distribution can be determined and indicated by a pulse height analyzer. Another mode of representation may be achieved by counting the individual pulses to indicate the number of particles passing through the plate.

In the embodiment of our invention shown in FIGS. 5 and 6, the magnetic properties of the particles are utilized in obtaining the desired measurement. In FIG. 5 we have shown a cross sectional view of a fuel line 50 across which a wire 52 is threaded to cover substantially the entire cross sectional area of the line. The wire 52 wound back and forth across the line forms an electrical coil which is connected in series with a resistor 54 and a D.C. power supply 56. The function of the D.C. power supply 56 is to establish a magnetic field through the coil 52. Alternatively, the magnetic field may be supplied by a permanent magnet in which case no D.C. power supply is required. This is shown in FIG. 6.

Because the inductance of the coil formed by the wire 52 is a function of the geometric configuration of the coil (a fixed quantity) and the net permeability relating to the coil, the signal voltage across the coil fluctuates with variations in the permeability of the material passing through and about the coil. This embodiment uses the time rate of change of the flux threading the coil due to the corresponding changes in permeability. Thus, if a fluid medium such as a liquid fuel bearing a number of particles with a permeability different from the fluid is directed through or about the magnetic field, in effect the flux in the coil varies and the voltage drop across the coil varies correspondingly. When the capacitor plates are replaced by the coil with its magnetic field, the measuring circuits shown in FIGS. 3 and 4 perform the same function as for the previous embodiment. That is, they render the same types of measurements depending upon the time characteristics of the resistance-inductance network. Moreover, the total volume, percentage volume, instantaneous concentration, variance, particle size distribution and particle count may be measured in precisely the same manner as suggested in connection with the embodiments of our invention employing a capacitor.

Figure 2:
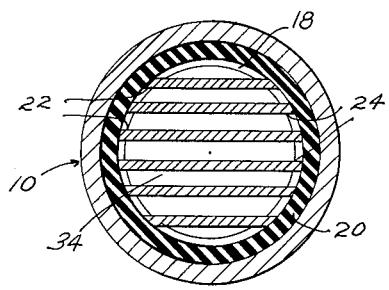
FIGURE 2 is a cross sectional view taken along the corresponding section line in FIG. 1.

Another embodiment of our invention is shown in FIG. 7. This embodiment depends upon the fluctuation of the resistance due to the passing of the particles between the plates in FIGS. 1 and 2. In this embodiment, a current is caused to flow through the fluid between the plates 22 and 24 by the D.C. power supply 30. When a particle having a resistivity different from the fluid penetrates the boundary of the conductive current between the plates 22 and 24, it causes a fluctuation in the current that produces a voltage fluctuation across the resistance-capacitance network made up of the capacitor 80 and the resistor 82. The resistor 84 in circuit with the resistor formed by the plates 22 and 24 merely serves to insure the existence of a load across the power supply. To those skilled in the art it will be apparent that the voltage output from the resistance-capacitance network depends only on the rate of change of the resistivity between the plates. This makes it possible to combine the various measuring circuits employed in the previous embodiments with the sensing network shown in FIG. 7. This includes the methods for measuring total volume, percentage volume, instantaneous concentration, variance, particle size distribution and particle count.

Although we have described several embodiments of our invention, it is to be understood that numerous modifications may be made of each embodiment without departing from the spirit of our invention. Therefore, we do not intend to limit the breadth of this invention to the specific embodiment illustrated and described but rather it is our intention that the breadth of this invention be determined by the appended claim and its equivalents.

We claim:

A method of determining the ratio of particles to the total volume of a mixture which includes the particles comprising the steps of passing the mixture with the particles between the plates of a capacitor which forms part of an electrically excited resistance-capacitance network sufficiently slowly so that the time constant of the network is shorter than the time required for the particles to cross through the boundaries between the plates causing a time rate of change of the electrical properties of the network to produce a pulse for each particle from said electrical network, producing a signal representing the time integral of said pulses, measuring the total volume of said mixture, and providing a signal representative of the quotient of said time integral divided by said total volume of the mixture which has passed between the plates.

References Cited by the Examiner

UNITED STATES PATENTS

| | | | |
|---|---|---|---|
| 2,237,254 | 4/1941 | Broekhuysen | 324—40 X |
| 2,238,091 | 4/1941 | Zuschlag | 324—40 |
| 2,337,132 | 12/1943 | Shaw | 324—41 X |
| 2,349,992 | 5/1944 | Schrader | 324—61 XR |
| 2,485,579 | 10/1949 | Elliott | 324—61 |
| 2,599,583 | 6/1952 | Robinson et al. | 324—61 |
| 2,656,508 | 10/1953 | Coulter | 324—71 |
| 2,671,200 | 3/1954 | Lederer | 324—71 |
| 2,772,393 | 11/1956 | Davis | 324—40 |
| 2,807,720 | 9/1957 | Charles | 324—61 X |

WALTER L. CARLSON, *Primary Examiner.*

LLOYD McCOLLUM, SAMUEL BERNSTEIN, FREDERICK M. STRADER, *Examiners.*